(12) United States Patent
Guo et al.

(10) Patent No.: US 9,973,723 B2
(45) Date of Patent: May 15, 2018

(54) USER INTERFACE AND GRAPHICS COMPOSITION WITH HIGH DYNAMIC RANGE VIDEO

(71) Applicant: Apple Inc., Cupertino, CA (US)

(72) Inventors: Haitao Guo, San Jose, CA (US); Kenneth I. Greenebaum, Cupertino, CA (US); Guy Cote, San Jose, CA (US); David W. Singer, San Francisco, CA (US); Alexandros Tourapis, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 14/502,373

(22) Filed: Sep. 30, 2014

(65) Prior Publication Data

US 2015/0245004 A1 Aug. 27, 2015

Related U.S. Application Data

(60) Provisional application No. 61/943,887, filed on Feb. 24, 2014, provisional application No. 61/945,629, filed on Feb. 27, 2014.

(51) Int. Cl.
*H04N 5/46* (2006.01)
*G09G 5/02* (2006.01)
(Continued)

(52) U.S. Cl.
CPC .............. *H04N 5/46* (2013.01); *G09G 5/006* (2013.01); *G09G 5/026* (2013.01); *G09G 5/363* (2013.01);
(Continued)

(58) Field of Classification Search
USPC ........................................... 345/629
See application file for complete search history.

(56) References Cited

U.S. PATENT DOCUMENTS 5,737,032 A * 4/1998 Stenzel ............... H04N 9/68
348/649
6,388,648 B1 * 5/2002 Clifton ............... H04N 9/3147
345/4

(Continued)

OTHER PUBLICATIONS

"scRGB", Wikipedia the Free Encyclopedia, Feb. 2010, [online], [retrieved on Mar. 31, 2016], Retrieved from the Internet <URL:https://en.wikipedia.org/wiki/ScRGB>.*

*Primary Examiner* — Barry Drennan
*Assistant Examiner* — Terrell Robinson
(74) *Attorney, Agent, or Firm* — Baker & Hostetler LLP (57) ABSTRACT

A method and system for adaptively mixing video components with graphics/UI components, where the video components and graphics/UI components may be of different types, e.g., different dynamic ranges (such as HDR, SDR) and/or color gamut (such as WCG). The mixing may result in a frame optimized for a display device's color space, ambient conditions, viewing distance and angle, etc., while accounting for characteristics of the received data. The methods include receiving video and graphics/UI elements, converting the video to HDR and/or WCG, performing statistical analysis of received data and any additional applicable rendering information, and assembling a video frame with the received components based on the statistical analysis. The assembled video frame may be matched to a color space and displayed. The video data and graphics/UI data may have or be adjusted to have the same white point and/or primaries.

25 Claims, 5 Drawing Sheets

(51) Int. Cl.
*G09G 5/36* (2006.01)
*H04N 21/422* (2011.01)
*H04N 21/4223* (2011.01)
*H04N 21/426* (2011.01)
*H04N 21/431* (2011.01)
*H04N 21/44* (2011.01)
*H04N 21/4402* (2011.01)
*H04N 21/442* (2011.01)
*H04N 21/45* (2011.01)
*H04N 21/485* (2011.01)
*G09G 5/00* (2006.01)

(52) U.S. Cl.
CPC ... *H04N 21/4223* (2013.01); *H04N 21/42202* (2013.01); *H04N 21/42653* (2013.01); *H04N 21/431* (2013.01); *H04N 21/4402* (2013.01); *H04N 21/44008* (2013.01); *H04N 21/44218* (2013.01); *H04N 21/4532* (2013.01); *H04N 21/4854* (2013.01); *G09G 2340/06* (2013.01)

(56) References Cited

U.S. PATENT DOCUMENTS

| | | | |
|---|---|---|---|
| 6,567,124 B1* | 5/2003 | Tran | H04N 5/208 348/222.1 |
| 7,071,947 B1* | 7/2006 | Papakipos | G06T 15/50 345/426 |
| 7,103,904 B1 | 9/2006 | Blackketter et al. | |
| 7,213,255 B2 | 5/2007 | Markel et al. | |
| 7,372,507 B2* | 5/2008 | Ikeda | H04N 5/202 348/674 |
| 7,714,830 B2* | 5/2010 | Daly | G09G 3/3426 345/102 |
| 8,073,955 B1 | 12/2011 | Gagnon et al. | |
| 8,413,205 B2 | 4/2013 | Carney et al. | |
| 2004/0161152 A1* | 8/2004 | Marconi | G06K 9/00456 382/190 |
| 2005/0117799 A1* | 6/2005 | Fuh | G06T 5/009 382/169 |
| 2008/0088593 A1* | 4/2008 | Smoot | G06F 3/0425 345/173 |
| 2008/0130994 A1* | 6/2008 | Lin | G06T 5/009 382/169 |
| 2009/0027558 A1* | 1/2009 | Mantiuk | H04N 1/6027 348/673 |
| 2010/0079489 A1* | 4/2010 | Cheng | G06T 15/503 345/629 |
| 2010/0251294 A1 | 9/2010 | Ool | |
| 2011/0194618 A1* | 8/2011 | Gish | G06T 5/50 375/240.25 |
| 2012/0201456 A1* | 8/2012 | El-Mahdy | G06T 5/009 382/167 |
| 2012/0281128 A1* | 11/2012 | Shintani | H04N 5/60 348/333.01 |
| 2013/0148029 A1* | 6/2013 | Gish | G09G 5/02 348/708 |
| 2013/0241931 A1* | 9/2013 | Mai | G06T 11/60 345/428 |
| 2013/0314495 A1* | 11/2013 | Chen | H04N 13/0048 348/43 |
| 2014/0002694 A1* | 1/2014 | Levy | G06T 5/50 348/239 |

* cited by examiner

USER INTERFACE AND GRAPHICS COMPOSITION WITH HIGH DYNAMIC RANGE VIDEO

CROSS-REFERENCE TO RELATED APPLICATIONS

This application claims the benefit of U.S. Provisional Application Ser. No. 61/943,887, filed Feb. 24, 2014, and U.S. Provisional Application Ser. No. 61/945,629, filed Feb. 27, 2014, each of which is incorporated herein by reference in its entirety.

BACKGROUND

Video composition systems are components of consumer electronic devices such as personal computers, media players, video games, and the like. Video composition systems combine data from different sources of visual content for display in a video rendering process. The elements received in the data streams and assembled by a compositor of the video composition system may include still picture/video data and other graphics/user interface (UI) data. For example, a compositor may apply closed captioning or graphical user interface elements such as buttons for playback control, over one or more video streams. The compositor may also perform more complex blending and visual effects between video and UI elements. For example, the video could be blurred before being blended with UI elements.

The various visual elements to be mixed by the compositor may be of different dynamic ranges and color spaces. For example, video may be in a High Dynamic Range (HDR) and/or Wide Color Gamut (WCG) format, while graphics/UI elements may be in a standard dynamic range (SDR) or Standard Color Gamut (SCG) format. The HDR representation of video data may have a transfer function including a definition for a peak brightness. Standard dynamic range (SDR) video, such as sRGB, typically is mapped according to broadcasting service HDTV standards defined by Recommendation ITU-R BT.709-5 (Rec. 709). Rec. 709 defines image format parameters and values for HDTV, including color primaries and white point. Graphics and UI elements are typically designed according to a reference standard dynamic range color space (sRGB) display. Existing video compositing systems mix the video data and graphics/UI in sRGB and display the final frame with limited dynamic range. Typically, UI elements are rendered into the same color space as video.

With the evolution of video coding, capture, and display technologies, the dynamic range of video data may become increasingly divergent from the dynamic range of graphical/UI elements. For example, video data can be of high dynamic range, while the user interface and graphical components remain in standard dynamic range. Alternatively, both video and user interface data may be in high dynamic range, but differ in their ranges. When visual elements to be combined have disparate dynamic ranges and/or color spaces, there are challenges to mixing the visual elements while retaining or mapping color information of the elements and adapting colors and luminance to varying display conditions. Thus, there exists a need for a video compositing system that can combine HDR and/or WCG components with SDR and SCG components and/or other HDR and/or WCG components in a cost-effective manner.

DETAILED DESCRIPTION

The present invention relates to a method and system for adaptively mixing HDR video components with SDR/SCG and/or HDR/WCG graphics/UI components such that a resultant frame that includes both types of components is optimized for a color space (e.g., a native color space) of a display device, ambient conditions, as well as viewing distance and angle.

The composition method may include receiving video and graphics/UI elements, converting the video to a high dynamic range or wide gamut color space, performing statistical analysis of received data and any additional applicable rendering information, and assembling a video frame with the received components based on the statistical analysis. Statistical information about the video can be pre-computed and passed to the display device, e.g., as side information. The assembled video frame may be matched to a color space of a display and displayed. In assembling the frame, the composition method may account for characteristics of the received video data, graphics/UI data, ambient conditions of the display, and user commands, to display an optimal and/or desired frame on the display. The video data and graphics/UI data may already be, or may have been adjusted to be, in an extended dynamic range while retaining the same white point and/or primary chromaticities ("primaries"), for example Rec. 709 primaries. This advantageously simplifies computations of the transformation process.

The composition unit automatically may adapt HDR inputs based on a display device's ability to render the frame and improve visibility in non-ideal viewing environments. The composition unit may output a frame that uses less backlight in the display device, which may save power in many viewing environments. In some instances, the output frame may make the display and/or backlight appear like paper to mimic ideal reading conditions to alleviate eyestrain.

Figure 1:
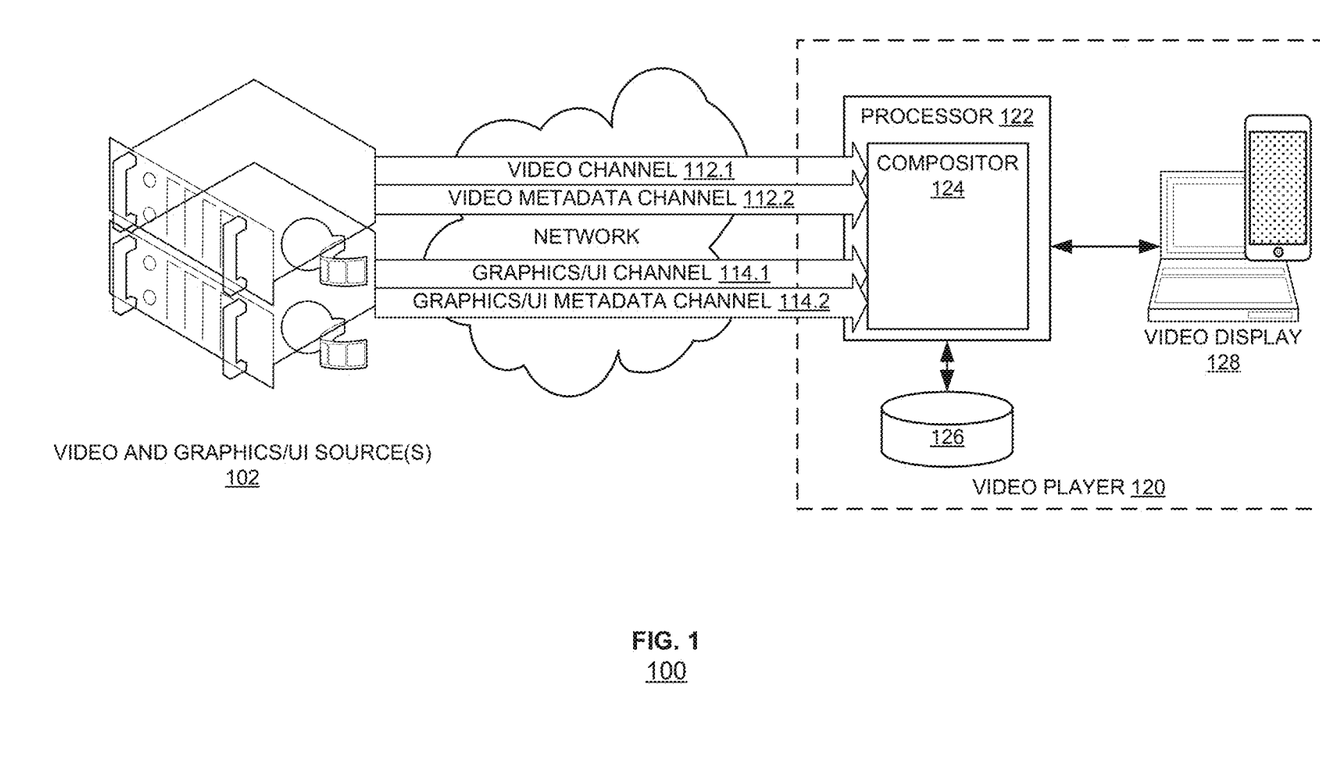
FIG. 1 is a simplified block diagram of a video delivery system according to an embodiment of the present invention.

FIG. 1 is a simplified block diagram illustrating components of a video delivery system 100. The system 100 may include one or more video and/or graphics/UI sources 102, one or more channels 112, 114 for transmitting video and graphics/UI data, a video player 120, a processor 122, a compositor 124, a memory system 126, an display device 128.

The video delivery system 100 may include video and visual elements source(s) 102 and a video player 120 such as a set-top video decoding device, a DVD player, or a client software application. The sources 102 and the video player 120 may be coupled to each other via a network.

The video and graphics/UI source(s) 102 provides content via one or more channels 112, 114. The source(s) may provide data of various types or a single type. For example, one source may provide video data only, while another source may provide graphical/UI data only. The elements may come from different devices, for example, video footage may be provided by storage, while UI icons for controlling playback may be provided by a local operating system, e.g., a DVD player. In an alternative example, a single source may provide both video and graphical/UI data. That is, a common device may provide different elements, for example, video footage and captions in the same movie may be provided by a storage device, e.g., a DVD. Multiple sources may also provide a mixture of different types of content. For example, the source may be a DVD or streaming media server.

The video and other visual content may be delivered over a network, such as a local area network or the Internet, via channels 112, 114. The content may be delivered in a single channel and the data categorized when received. Alternatively, different types of content may be transmitted over different channels. For instance, video data may be transmitted via a video channel 112 and other visual data may be transmitted via a graphics/UI channel 114. Video data may be transmitted over a network while UI data may be generated locally in the video player or display device. The video and other visual content may also be derived from local storage, without being transmitted over a network. For example, the content may be retrieved and displayed on a computer: the content may be stored on a storage device such as a DVD or flash memory; parsed, processed and rendered by a reader and graphics processing unit; and displayed on a display screen of a computer.

The video player 120 may include a processor 122 communicatively coupled to a memory 126 and a video display 128. The processor 122 and video display 128 may be integrated in the same hardware or may be separate hardware components. The processor 122 may render decoded video data and may include a compositor 124 that may integrate decoded frames of video with other screen elements to complete a frame. The processor 122 may execute program instructions and process data stored in memory 126, which instructions may implement the methods described herein. The processor 122 may utilize user input, which may be entered through the video display 128 or via another input device (not shown), and/or sensor information regarding the video display 128 to assemble the frames of video and screen elements. For example, the processor and/or display may be a graphical processing unit. The video display 128 may display a completed frame to a user of the video player 120. The video display 128 may include sensors and input devices to provide data to the processor for assembling the frames of video and graphical/UI data. For example, the video display may be a touch and light sensitive display.

In operation, the video delivery system 100 delivers multimedia content. The video and graphics/UI source(s) may transmit coded video and graphical data via channel(s) 112, 114 to a video player 120. The content may be received, decoded, and rendered by a processor 122. More specifically, the video and graphical/UI content may ultimately be received by a compositor 124. The compositor may assemble the video and graphics/UI data based on statistical analysis of the received data and display conditions, if provided, e.g., according to the methods described herein, and generate completed graphical output that may be rendered via the video display 128.

The techniques of the present invention find application in a variety of consumer electronic devices, including, for example, tablet computers. Although FIG. 1 illustrates a representative array of multimedia sources 102 and video displays 120 (e.g., PCs, notebooks, smartphones, and gaming systems) that are common to video delivery systems 100, different devices may employ different combinations of such devices. For example, tablet computers and smartphones may include a touch screen and light sensor, but need not include a dedicated keyboard device, mouse, or joystick. Many gaming platforms may include a camera and game controller but may not include a dedicated touch screen, keyboard, or mouse. Accordingly, the configuration of FIG. 1 may be altered to suit different application needs. For the purposes of the present discussion, it is sufficient to note that the principles of the present invention apply to any device 120 that includes a processing unit 122 and display 128.

Figure 2:
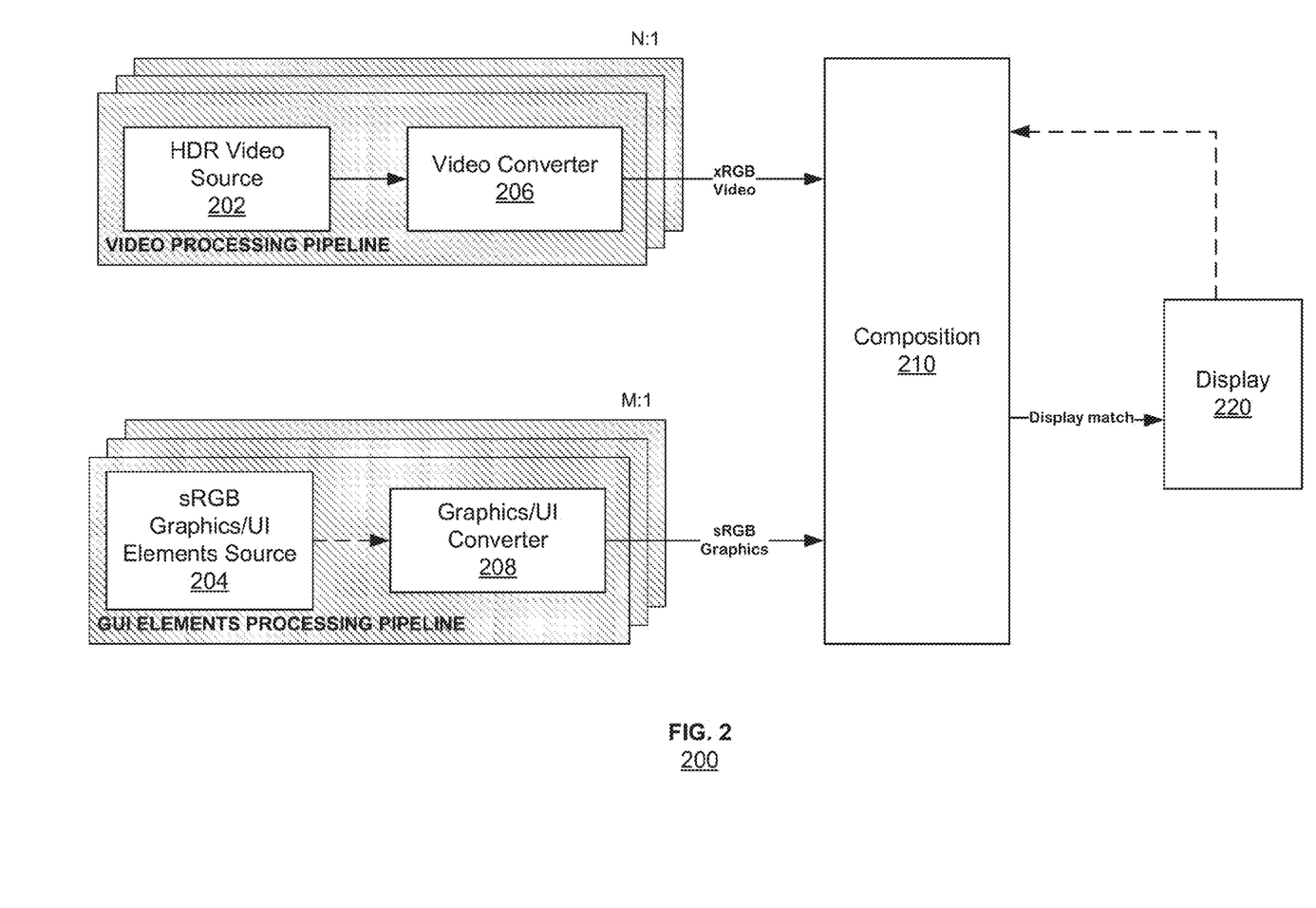
FIG. 2 is a functional block diagram of a composition pipeline architecture according to an embodiment of the present invention.

FIG. 2 illustrates a composition pipeline architecture 200 according to an embodiment of the present invention. The pipeline 200 may include one or more video sources 202, one or more graphics/UI elements sources 204, one or more video converters 206, one or more graphics/UI converters 208, a composition unit 210, and a display device 220. For convenience, the following discussion considers a single input of video and a single input for GUI elements.

Input to the pipeline 200 may include the video components 202. The video components may be received by the pipeline 200 in a single stream or multiple streams, for example N streams. The video source 202 may supply HDR video data. Alternatively, some of the video components may be SDR video data. At least a portion of the video components may also be in a wide gamut color space. The video components may be transmitted within the pipeline 200 for conversion to another color space.

Input to the pipeline 220 may also include UI and graphics components 204. The graphical and user interface components may be received by the pipeline 200 in one or more streams, for example M streams. The graphics/UI elements source 204 may supply elements of a standard dynamic range such as sRGB. The graphics/UI elements may have a primary typical of the sRGB color space, such as within the range [0, 1]. Compared with a range of wide color gamut color spaces, the range of sRGB is typically more limited. sRGB generally uses eight bits per color component. The graphics/UI components may be transmitted for composition in a high dynamic range color space 210.

The pipeline 200 may include a video data converter 206. The video data converter may generate converted video data based on the received video input 202. The converter 206 may convert the received video 202 to a wide gamut color space. Examples of wide gamut color spaces ("xRGB" for convenience) include UHDTV Rec. BT.2020, DCI P3, ADOBE Wide Gamut RGB, ROMM RGB, ProPhoto RGB, CIE (1931) RGB, and CIE XYZ. The range of xRGB color space may be [−a, b], where a and b are integer values. The range of xRGB is typically wider than the range of sRGB. For example, a lower limit a, of the range may include negative values, which may allow for a wider color gamut. Positive and negative values for range limits, a and b, may be used to represent a color space or color cube in RGB. A larger range corresponds to wider and darker/brighter colors. The values of a and b may be programmable and/or be fixed default values. xRGB typically uses more than eight bits per color component.

The pipeline 200 may include a graphics/UI elements converter 208, which may have the same functions and features as the video data converter 206. The converter 208 may convert the received graphical elements 204 to another color space, which may be a standard color space or a wide gamut color space.

The composition unit 210 may evaluate the dynamic range of the video content and the graphics/UI elements to display a frame optimized for and/or requested by the display device. The composition unit 210, which may be a hardware or software component, may receive video content 206 and graphics/UI content 204, evaluate the received content, determine where to place the graphics/UI content in relation to video content, and output a frame with the mixed content. The composition unit 210 may generate frames in a display-oriented manner, optimizing the frames based on specified conditions and/or ambient conditions of the display device. To mix the content, the composition unit 210 may consider dynamic ranges and luminance of the inputs, detected ambient conditions including lighting levels of the display device, a mode of operation specified by a user, metadata that may have been already provided with the content, and the viewer's position relative to the display panel (e.g. viewing distance, viewing angle). For example, the metadata, which may be transmitted in a bitstream, may indicate whether, where, size, color, and/or brightness of captions and/or graphics/UI should be displayed on a frame. Information about multiple viewers may also be considered. The mode of operation may override the other considerations or limit the effects of the other considerations.

The display device 220 may provide input to the composition unit 210 regarding its parameters, its ambient conditions, and/or desired display conditions. The parameters of the display device may include display resolution and color space. The ambient conditions of the display device may include a level of lighting. A user may also specify, through the display device or another input device, that the frames are to be viewed in a cinematic, calm, or disability-friendly mode. Consideration of display input may increase the effectiveness and speed of the composition and decrease power consumption of the display device. For example, certain modes may allow for fewer bits to be used to achieve the desired effect.

In operation, the pipeline 200 may receive video and graphics/UI data at respective sources 202, 204. The converter 206 may convert the received video data to xRGB video such that the xRGB video and the sRGB graphics/UI elements share at least one characteristic. For example, they may share substantially the same primaries, such as the same sRGB primary or the sRGB range may fit inside the xRGB range. They may also share substantially the same transfer function (TF), such as an electro-optical transfer function, an optical-electrical transfer function, gamma curve or a log curve, for coding and decoding luminance or tristimulus values. This advantageously simplifies implementation by avoiding conversion between two different TF, or gamma correction, schemes, and assists backward compatibility. In an alternative embodiment, the sRGB and xRGB components may use different TFs, and the sRGB TF may be mapped to the TF of the xRGB domain.

In addition, or alternatively, the pipeline 200 may convert the received graphical user interface data to xRGB data using converter 208. The outputs of the converters 206, 208 may be provided to the composition unit 210. In some embodiments, the graphics/UI elements may be directly transmitted to composition unit 210 without processing by converter 208. The composition unit 210 may stitch together the video and graphics/UI elements based on statistical analysis of the inputs, ambient conditions of the display device, and any received commands, generating a frame.

The composition unit 210 may output the frame. The pipeline 200 may match the frame to the particular characteristics of the display device, for example the frame may be matched to the display resolution, dynamic range, and/or gamut of the display 220. For example, the rendered frame may be initially of a high dynamic range, and then converted to a different dynamic range or a standard dynamic range for displaying at the display device 220. The display device 220 may display in various combinations of dynamic ranges and color space modes, e.g., SDR, Rec. 709, Rec. 2020, P3, etc.

In an alternative embodiment, composition may be performed in the color space of the display device 220 instead of an intermediate xRGB color space. For instance, all of the input content may be converted to match the specifications of the display 220, and composition of the frame may be performed according to the display's specifications.

Figure 3:
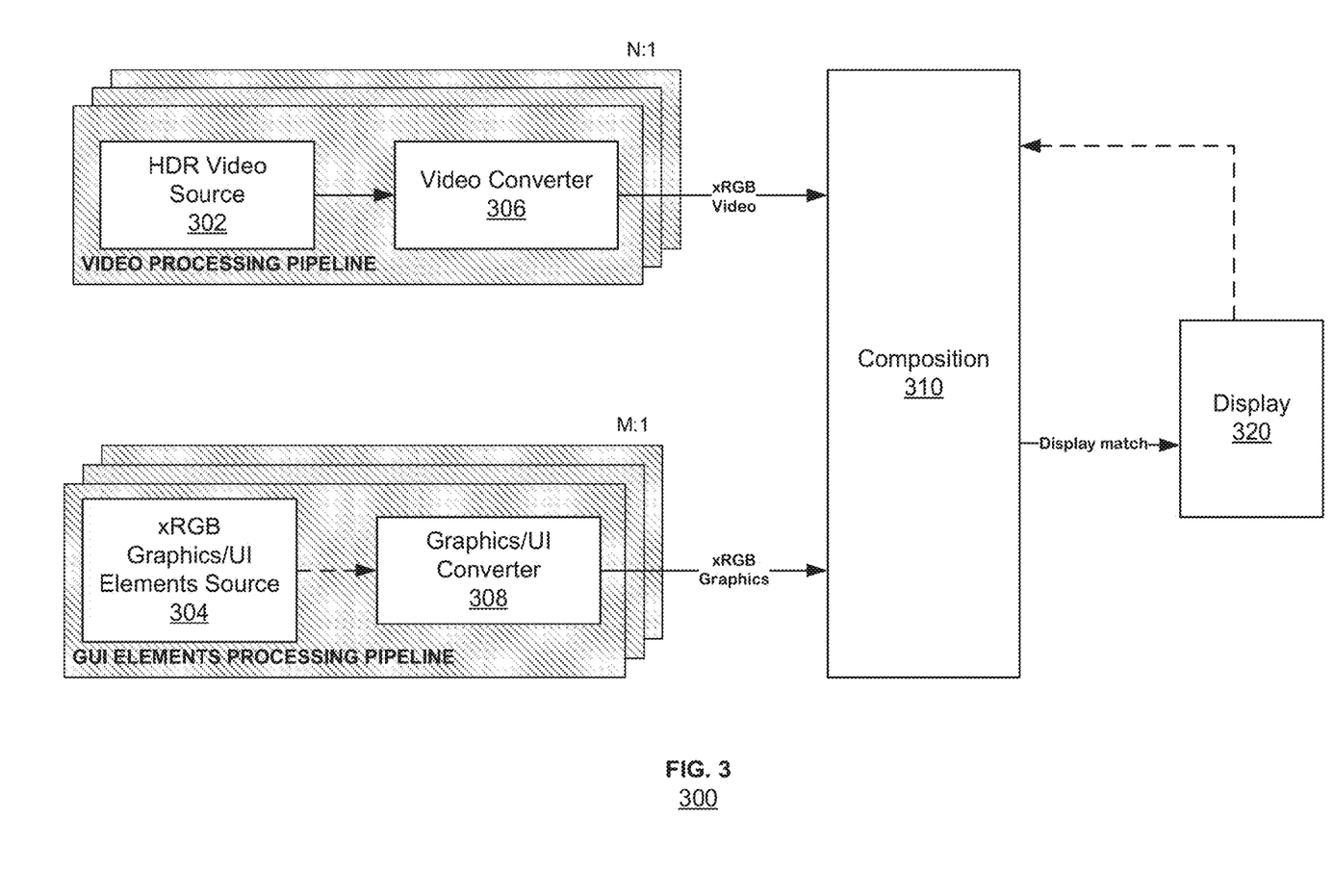
FIG. 3 is a functional block diagram of a composition pipeline architecture according to another embodiment of the present invention.

FIG. 3 illustrates another composition pipeline architecture 300 according to an embodiment of the present invention. The components of the pipeline 300 have the same functions and features as the corresponding components described in relation to pipeline 200 unless otherwise described herein.

The pipeline 300 may include one or more video sources 302, one or more graphics/UI elements sources 304, one or more video converters 306, one or more graphics/UI converters 308, a composition unit 310, and a display device 320. For convenience, the following discussion considers a single input of video and a single input for GUI elements.

Input to the pipeline 300 may include the video components 302. The video components may be received by the pipeline 300 in a single stream or multiple streams, for example N streams. The video source 302 may supply HDR video data. Alternatively, some of the video components may be SDR video data. At least a portion of the video components may also be in a wide gamut color space. The video components may be transmitted within the pipeline 300 for conversion to another color space.

Input to the pipeline 320 may also include UI and graphics components 204. The graphical and user interface components may be received by the pipeline 200 in one or more streams, for example M streams. The graphics/UI elements source 304 may supply graphical elements, at least a portion of which are HDR ("xRGB" for simplicity"). The xRGB graphics/UI elements 304, which, like the converted video input 306 are of high dynamic range, may be of the same or different dynamic ranges as the converted video input 306. In an embodiment, the xRGB graphics/UI elements and xRGB video have the same primaries, even if they may be of different dynamic ranges. The graphics/UI components may be transmitted for composition in a high definition color space 310.

The pipeline 300 may include a video data converter 306. The video data converter may generate converted video data based on the received video input 302. The converter 306 may convert the received video 302 to a wide gamut color space. Examples of wide gamut color spaces ("xRGB" for convenience) include UHDTV, ADOBE Wide Gamut RGB, ROMM RGB, ProPhoto RGB, CIE (1931) RGB, and CIE XYZ.

The pipeline 300 may include a graphics/UI elements converter 308, which may have the same functions and features as the video data converter 306. The converter 308 may convert the received graphical elements 304 to another color space, which may be a standard color space or a wide gamut color space. In some embodiments, the graphics/UI elements may be directly transmitted to composition unit 310 without conversion.

The composition unit 310 may evaluate the dynamic range of the video content and the graphics/UI elements to display a frame optimized for and/or requested by the display device. The composition unit 310, which may be a hardware or software component, may receive video content 306 and graphics/UI content 304, evaluate the received content, determine where to place the graphics/UI content in relation to video content, and output a frame with the mixed content. The composition unit 310 may generate frames in a display-oriented manner, optimizing the frames based on specified conditions and/or ambient conditions of the display device. To mix the content, the composition unit 310 may consider dynamic ranges and luminance of the inputs, detected ambient conditions including lighting levels of the display device, and a mode of operation specified by a user, metadata that may have been already provided with the content, and the viewer's position relative to the display panel (e.g. viewing distance, viewing angle). For example, the metadata, which may be transmitted in a bitstream, may indicate whether, where, size, color, and/or brightness of captions and/or graphics/UI should be displayed on a frame. Information about multiple viewers may also be considered. The mode of operation may override the other considerations or limit the effects of the other considerations.

The display device 320 may provide input to the composition unit 310 regarding its parameters, its ambient conditions, and/or desired display conditions. The parameters of the display device may include display resolution and color space. The ambient conditions of the display device may include a level of lighting. A user may also specify, through the display device or another input device, that the frames are to be viewed in a cinematic, calm, or disability-friendly mode. Consideration of display input may increase the effectiveness and speed of the composition and decrease power consumption of the display device. For example, certain modes may allow for fewer bits to be used to achieve the desired effect.

In operation, the pipeline 300 may receive both video and graphics/UI data from respective sources 302, 304. The pipeline 300 may convert the received video data to xRGB video 306 such that the xRGB video and the xRGB graphics/UI elements share at least one characteristic. In addition or alternatively, the pipeline 300 may convert the received graphical user interface data to xRGB data. For example, they may share substantially the same primaries. They may also share substantially the same TF, or gamma curve, for coding and decoding luminance or tristimulus values. This advantageously simplifies implementation by avoiding conversion between two different TF/gamma correction schemes, and assists backward compatibility. The output of converters 306, 308 may be provided to the composition unit 310. In some embodiments, the graphics/UI elements may be directly transmitted to composition unit 310 without processing by converter 308. The composition unit 310 may stitch together the video and graphics/UI elements based on statistical analysis of the inputs, ambient conditions of the display device, and any received commands, generating a frame. The composition unit 310 may output the frame. The pipeline 300 may match the frame to the particular characteristics of the display device, for example the frame may be matched to the display resolution, dynamic range, and/or gamut of the display 320. For example, the rendered frame may initially be of a high dynamic range, and then converted to a different dynamic range or a standard dynamic range for displaying at the display device 320. The display device 320 may display in various combinations of dynamic ranges and color space modes, e.g., SDR, Rec. 709, Rec. 2020, P3, etc.

Figure 4:
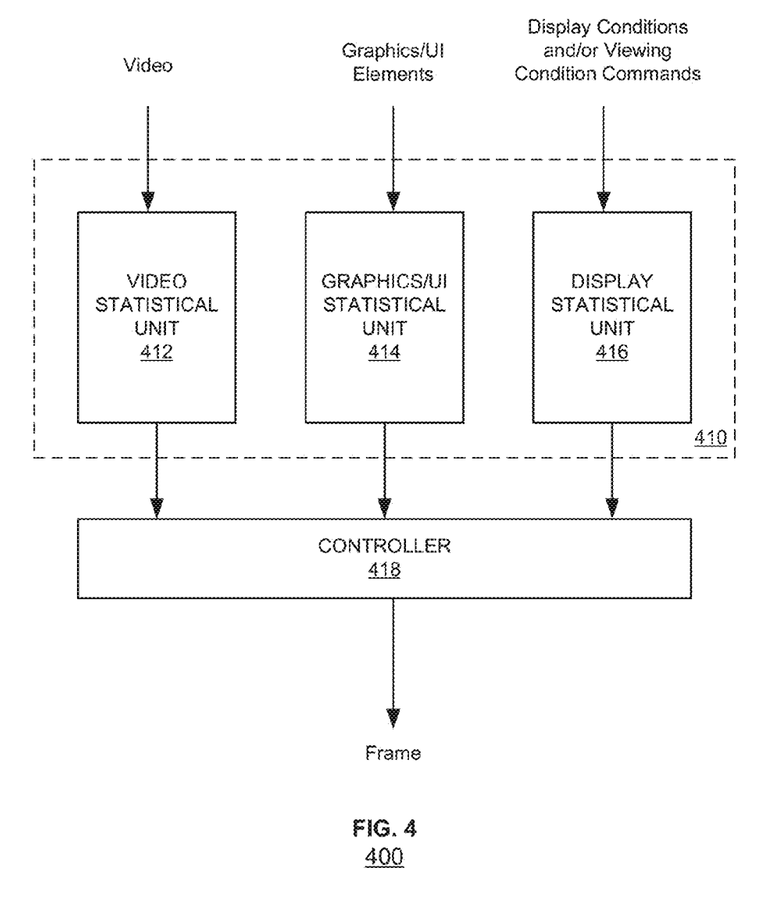
FIG. 4 is a simplified block diagram of a compositor according to an embodiment of the present invention.

FIG. 4 is a simplified block diagram illustrating components of compositor 400 according to an embodiment of the present invention. The compositor 400 may be included in a composition pipeline such as the ones shown in FIG. 2 and FIG. 3. The compositor 400 allows transformations tuned to video and graphical/UI inputs and display conditions. The video and graphical/UI streams may include any combination of HDR, SDR, WCG, and SCG components.

The compositor 400 may include a controller 418 and a statistical unit 410. The statistical unit 410 may include separate modules for each type of data to be assessed: a video statistical unit 412, a graphics/UI statistical unit 414, and a display statistical unit 416. Each of the statistical units may receive input data that is analyzed and processed. The controller 418 may be coupled to each of the statistical units 412, 414, 416. The controller 418 may provide instructions for performing statistical analysis on the inputs received by the respective units. The controller 418 may blend input data based on attributes of the input data, ambient conditions of the display unit, and/or definable modes of operation.

Some of the operations performed by the controller 418 may be techniques known in the art, such as alpha blending. The composition may also be flexible and include procedures in addition or in place of the alpha blending. The mathematics of the composition may be in any TF domain such as a linear, gamma, Log, or DOLBY PQ domain. According to an embodiment, the TF curve applied to the video input and the graphics/UI elements by each of the corresponding units 412, 414 may be substantially the same TF curve. This may be computationally efficient, because it simplifies the mathematical calculations and eliminates conversion steps.

Attributes of input video content such as brightness or luminance may define how the graphical/UI elements are displayed. For example, the attributes of the input video content may determine where the graphical/UI elements are placed within a frame. The compositor 400 may also adjust the brightness or luminance of graphical/UI elements to match or complement the brightness or luminance of the input video content. Similarly, the brightness or luminance of the input graphical/UI elements may define how the input video content is displayed. The matching and selection of the luminance may be performed according to the Color Appearance Modeling for Color Management Systems (CIECAM02).

Ambient conditions of the display may also define how the video and/or graphical/UI elements are displayed, including location of UI elements within the frame and the brightness of elements within the frame. Analysis of and adaptation to the ambient conditions of the display device may be used in the composition process to generate a more optimal frame. This is because human visual perception differs from a measured response of a display. Factors that affect perception include ambient lighting, relative luminance and chromaticity of visual components within the same frame, and psychophysical processes. Viewing conditions and their effects on appearances of objects are described in CIECAM02. Human vision adapts to around 256 distinguishable intensities at any given time, and generally adapts to the brightest stimulus. Human perception also varies non-linearly with increasing light. Displays may only excite a fraction of perception, and the perception of the display is at times different from the measured response of the display. Thus, factoring ambient light into the projected effect of a display, will optimize viewing for the audience. One or more of the following ambient conditions of the display device may be measured: a level of light leakage, a level of light reflection, a backlight level, and a physical size of the display.

The ambient conditions may be sensed by sensors coupled to and/or located on the display device. The sensors may alternatively be located in the display environment, but not on the display device. For example, a signal from an ambient light sensor or other hardware component, which may be readily available in existing hardware components, may be received by the display statistical unit 416. In an embodiment, the sensor may be an ambient light sensor or other photo detector facing a user of the display device to determine the amount of light hitting the display. In an alternative embodiment, the ambient light sensor may be configured to detect the color of light reflecting off of the display, which may advantageously model a pedestal more accurately.

In a further embodiment, a forward facing ambient light sensor may determine what a user of the display device is seeing. In yet another embodiment, a forward facing ambient light sensor configured to determine the color of what the user is seeing, may also detect the white point of what the user is seeing. Sensor(s) may be further configured to detect a backlight level, determine a current display image by measuring a current average pixel brightness reflecting pixels on the display device that are actually currently illuminated, and sense a distance between the device and a user of the device. For instance, a camera may detect an eye distance and determine a field of view of that the display subtends. The sensor(s) may also perform 3D sensing such as time of flight, structured light. The 3D sensing may be used to determining a position of one or more viewers in a room and adapt the display to the positions of the viewer(s). Multiple viewers and their relative positioning to each other and/or the screen may also be considered. Information about the user may be detected, e.g., based on facial recognition, or via metadata transmitted. Information about the user and the user's relation to the media being streamed may include a user's identity, age, past preferences, mood, time of day, and content characteristics.

Based on the detected ambient conditions, the compositor 400 may shade the frame, perform local tone mapping, and/or warp existing color space conversions (e.g., one-dimensional lookup tables (1D LUT), 2D LUTs, matrix multiplication, etc.) used to map one color space to another. For example, if the environment of a display device is relatively bright, the composition unit may map video samples to an extended range compared with lower-light conditions. The sensor may also measure a color temperature of outside light and adjust the display accordingly. For example, a display may be optimized for bluer daylight or more red tungsten light, or other viewing conditions.

Further, a mode of operation may override or delimit the range of adjustments made to a frame during composition. Each of the modes may have settings defining a range of behavior. The settings may be specifiable by a user or preset. The mode may be selected and transmitted to compositor 400 by an input device. The input device may be operated by a user. In a calm mode, the frame may be optimized for displaying in a manner that does not disturb neighbors of the user. For example, the frame may be displayed below a definable threshold brightness level. In an increased accessibility mode, a user may set the display device for use by the visually-impaired. The display device may then display graphical components with attributes that assist those with low vision, for example, displaying GUI elements at larger sizes and/or with higher contrast. In a cinematic mode, which may be selected to mimic viewing conditions in a cinema, the compositor 400 may map a frame to a full dynamic range of the display device. For example, in relatively dark environments, a wide dynamic range experience may be provided with conventional brightness displays by holding average brightness to less than maximum native display levels (e.g., ¼ of the linear brightness measurement). In such situations, the viewer's eyesight may adapt to the relatively lower peak values, and elements coded to be significantly brighter may use more of the display's native brightness (e.g., the maximum possible brightness based on native settings). The content may be coded with these considerations to express a higher dynamic range. For example, the desired effects may be brought about by increased precision (including a brighter reference), a different transfer function, and/or an extended-range representation (e.g., codings that exceed 1.0). As a further example, high dynamic range and/or wide color gamut content such as that described herein may be displayed on conventional 8-bit, 2.2 gamma, display pipe and/or displays by using spatial-temporal dither. The compositor 400 may also enhance the chromaticity and luminance of video samples, and optimize the frames for a low-light setting. One or more modes may be selected at any given time.

In an embodiment, the composition is performed in xRGB space, and the space may grow with large [−a, b] values during the composition. According to this embodiment, the space may grow such that a resulting xRGB space has a maximum range of all of the input data, including both the video input and the graphics/UI elements input.

In a further embodiment, the xRGB space may grow with higher bit depths during composition. According to this embodiment, the resulting xRGB space may have at least a maximum bit-depth for all of the input data.

Figure 5:
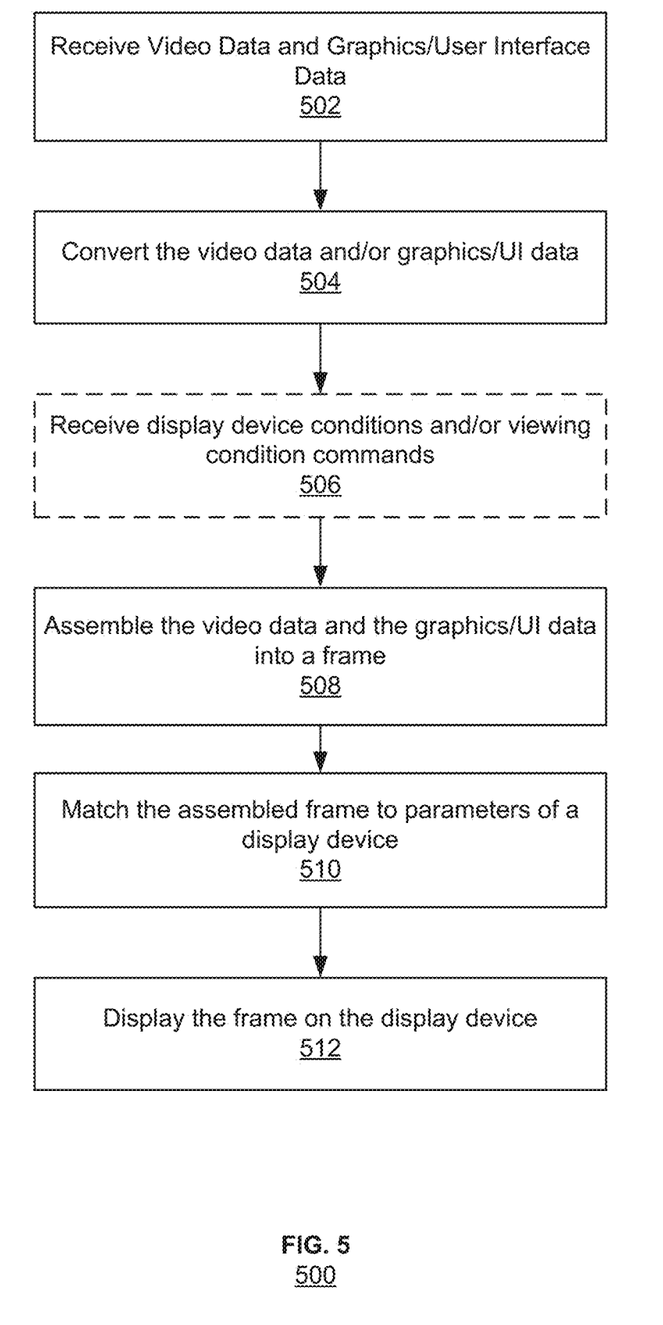
FIG. 5 is a flowchart of a method of video composition according to an embodiment of the present invention.

FIG. 5 illustrates a method 500 of video composition according to an embodiment of the present invention. The method 500 may receive video data and graphical/user interface data from input streams (box 502). Subsequent to receiving the video data, the method 500 may convert the video data to a high definition color space, such as UHDTV, ADOBE Wide Gamut RGB, ROMM RGB, ProPhoto RGB, CIE (1931) RGB, and CIE XYZ, in step 504. In step 508, the method 500 may perform composition of the received data, which includes the video data and the graphics/UI data according to the techniques described herein. The composition of the received data may include placement of the graphical/UI elements within the video data. The final frame may then be matched to parameters of the display device in step 510. The frame conforming to the parameters of the display device 500, may be displayed in step 510. Prior to composition in step 508, the method 500 may receive information from a display device on which the frame is to be displayed (box 506). The information may include the ambient conditions and the mode of operations further described herein. If display device conditions are received, the method 500 may assemble the frame based on the conditions.

We claim:

1. A computer-implemented compositing method, comprising:
   receiving, by a processor, first data from a first source having a first dynamic range and an associated first electro-optical transfer function (EOTF);
   receiving, by the processor, second data, from a second source different than the first source, having a second dynamic range that is lower than the first dynamic range and an associated second electro-optical transfer function;

converting, by the processor, the first data to a converted first data having a third dynamic range and an associated third electro-optical transfer function that matches at least a segment of the second electro-optical transfer function;

assembling, by the processor, a video frame from the converted first data and the second data, and rendering, by the processor, an output frame based on the assembled video frame.

2. The method of claim 1, further comprising converting, by the processor, the second data to a fourth dynamic range at least partially overlapping with the third dynamic range.

3. The method of claim 1, wherein the conversion of the first data retains at least one of a white point and primary chromaticities of the first data.

4. The method of claim 1, wherein the conversion of the first data includes converting the first data to one of a high dynamic range (HDR) and a wide color gamut (WCG).

5. The method of claim 1, wherein the converted first data and the second data share at least one primary chromaticity.

6. The method of claim 1, wherein the EOTFs are represented by a gamma curve.

7. The method of claim 1, wherein the assembly of the video frame is based on at least one of: (i) characteristics of the first data and the second data, (ii) ambient conditions of a display device, and (iii) commands received at a user interface of the display device.

8. The method of claim 1, further comprising performing statistical analysis based on additional rendering information relating to a display device and includes a level of light leakage, a level of light reflection, a backlight level, a physical size, a white point, and an average pixel brightness.

9. The method of claim 1, further comprising matching the assembled frame to a color space of the display device.

10. The method of claim 1, wherein the rendering of the output frame includes at least one of: storing the output frame in a non-transitory computer-readable medium, outputting the output frame to a network, and displaying the output frame on a display device.

11. The method of claim 1, wherein the second data has a EOTF matching at least a segment of a EOTF of the first dynamic range.

12. A video compositor, comprising:
a first analyzer operating on one or more processors to perform statistical analysis on a first video sequence with an associated first electro-optical transfer function representing natural video content;
a second analyzer operating on the one or more processors to perform statistical analysis on a second video sequence with an associated electro-optical second transfer function representing synthetic video content;
a controller operating on the one or more processors, responsive to data representing output conditions, configured to:
convert one of the video sequences from an original dynamic range domain to a converted domain having a third electro-optical transfer function (EOTF) curve that matches a shape of the curve of the electro-optical transfer function associated with the other video sequence;
blend the converted video sequence with the other, non-converted video sequence; and
adjust at least a color component of the synthetic video component to match the native video component.

13. The video compositor of claim 12, wherein the output condition is characteristics of the display device.

14. The video compositor of claim 12, wherein the output condition is an ambient viewing condition about a display.

15. The video compositor of claim 12, wherein the color component is a brightness level.

16. The video compositor of claim 12, wherein the color component is a luminance level.

17. A video composition pipeline for processing a pair of video components, each from different sources and associated with different electro-optical transfer functions, a first video component having a higher dynamic range than the second video component, comprising:
a first data converter configured to convert the first video component having the higher dynamic range to a color space different from its original color space; and
a composition unit configured to:
convert the first video component to a third dynamic range, the third dynamic range being higher than the second dynamic range, wherein electro-optical transfer functions (EOTFs) associated with the converted first component and the second component are of complementary shapes;
assemble a video frame based on the converted first component and the second component; and
render an output frame based on the assembled video frame.

18. The video composition pipeline of claim 17, further comprising a second data converter configured to convert the video component having the lower dynamic range to a color space different from its original color space.

19. The video composition pipeline of claim 17, wherein the first component is of a higher dynamic range (HDR) and the second component is of an HDR different from the first component.

20. The video composition pipeline of claim 17, wherein the second component is of a standard dynamic range (sRGB) format and
a color space of the first component is of a range [−a, b], where a and b are each integer values, the range being programmable and greater than the sRGB format.

21. The video composition pipeline of claim 17, wherein the assembly of the received components is based on ambient conditions including at least one of: a level of light leakage, a level of light reflection, a backlight level, a physical size of a display, a white point, an average pixel brightness of the display, and at least one color of light reflected by the display.

22. The video composition pipeline of claim 21, wherein the level of light leakage is measured by a photo detector facing a viewer of the display.

23. The video composition pipeline of claim 21, wherein, based on the ambient conditions, the assembly of the video frame includes at least one of: shading the frame, performing local tone mapping, and altering lookup tables for mapping one color space to another.

24. The video composition pipeline of claim 17, wherein the evaluation of the received components is based on a mode of operation specifiable by a user, wherein the mode of operation overrides other bases for the assembly of the received components.

25. The video composition pipeline of claim 17, wherein the assembly of the video frame is based on at least one position of a viewer relative to the display.

* * * * *